United States Patent [19]
Meyer

[11] Patent Number: 5,884,529
[45] Date of Patent: Mar. 23, 1999

[54] SHIFTING DEVICE FOR AN AUTOMATIC TRANSMISSION OF A MOTOR VEHICLE

[75] Inventor: Jörg Meyer, Wagenfeld, Germany

[73] Assignee: Lemförder Metallwaren AG, Stemwede-Dielingen, Germany

[21] Appl. No.: 861,360

[22] Filed: May 21, 1997

[30] Foreign Application Priority Data

May 22, 1996 [DE] Germany .......................... 196 20 515.8

[51] Int. Cl.⁶ .............................. F16H 59/04; F16H 63/38
[52] U.S. Cl. ..................................... 74/473.18; 74/473.27
[58] Field of Search ............................ 74/473.18, 473.27

[56] References Cited

U.S. PATENT DOCUMENTS

| | | | |
|---|---|---|---|
| 5,044,220 | 9/1991 | Raff et al. .............................. | 74/743.18 |
| 5,062,314 | 11/1991 | Maier et al. ........................... | 74/538 X |
| 5,070,740 | 12/1991 | Giek et al. ............................. | 74/743.18 |
| 5,622,079 | 4/1997 | Woeste et al. ............................. | 74/335 |
| 5,689,996 | 11/1997 | Ersoy ......................................... | 74/335 |

*Primary Examiner*—Allan D. Herrman
*Attorney, Agent, or Firm*—McGlew And Tuttle

[57] ABSTRACT

A shifting device for an automatic transmission of a motor vehicle is presented, which has two shift gates, wherein the first shift gate is an automatic shift gate and the second shift gate is a step-by-step shift gate. A selector lever support is mounted with the selector lever pivotably around the selector axis. The selector lever support accommodates the selector lever pivotably around a shifting axis and can be caused by a locking pin to mesh with a complementary recess of the housing.

7 Claims, 6 Drawing Sheets

SHIFTING DEVICE FOR AN AUTOMATIC TRANSMISSION OF A MOTOR VEHICLE

FIELD OF THE INVENTION

The present invention pertains to a shifting device for an automatic transmission of a motor vehicle with a first, automatic shift gate, with a second shift gate for a manual, step-by-step shifting operation (step-by-step shift gate), with a selector lever, which is pivotably mounted within a gear shifting gate around a selector axis located under same, wherein the selector axis is mounted in a housing, which accommodates the shifting device and is a rigid part of the vehicle body, with a shift axis, which is orthogonal to the selector axis and is located in the same plane as it is, and with a mounting point located above the shift axis in the housing.

BACKGROUND OF THE INVENTION

Steadily increasing requirements are imposed on shifting devices for automatic transmissions in terms of operating comfort. Therefore, there has been an increasing trend to additionally provide also manual shifting functions, besides the conventional automatic shifting functions. A second, separate shift gate is required for this in the shifting device. The selection of this shift gate makes it possible for the driver of the vehicle to shift the transmission step by step in a simple manner. To change over into the step-by-step shift gate from the conventional automatic shifting operation, it is necessary to mount the selector lever pivotably via a selector axis. It is furthermore necessary to fix the selector lever in the step-by-step shift gate.

A selector means for an automatic transmission of a motor vehicle has been known from DE 44 26 207, in which the selector lever can be pivoted to and fro between two different shift gates. The first shift gate makes possible the automatic operation, and the second shift gate makes possible a manual step-by-step shifting. To make this shifting device as compact as possible, the selector axis and the shifting axis of the selector lever were placed in a common plane. Furthermore, the two axes are orthogonal to one another. To change over from the automatic operation to manual operation, the selector lever is pivoted into the step-by-step shift gate. It now engages guide elements of a complementary design, which pick up and forward the signals of the manual shifting operation. This shifting device is complicated and therefore expensive as a consequence of a large number of components.

Furthermore, DE 195 26 059 discloses a shifting device for an automatic transmission of a motor vehicle, in which a selector lever is pivotable within a gear shifting gate around a selector axis that is located lower than it and is held in the shift positions P, R, N and D by spring forces acting at right angles to the longitudinal axis of the gear shifting gate against locking means located offset in relation to one another on the side, which locking means are associated with the shift positions. The selector axis of the selector lever is mounted in an intermediate part by means of a universal joint, the intermediate part being mounted pivotably around the selector axis on a housing that is a rigid part of the vehicle body, and the selector lever can be pivoted manually relative to the intermediate part in the selected shift position (D) associated with the automatic shifting around a drag bearing located higher than the selector axis in the direction of the selection movement to bridge over shifting contacts for the step-by-step shifting of the gears of the transmission.

SUMMARY AND OBJECTS OF THE INVENTION

The primary object of the present invention is to provide a shifting device for an automatic transmission of a motor vehicle, which has a second step-by-step shift gate for a manual, step-by-step shifting operation, besides a first, automatic shift gate. Such a shifting device shall be able to be manufactured in a simple manner and at low cost with the smallest possible number of individual parts.

According to the invention, a shifting device is provided for an automatic transmission of a motor vehicle. The shifting device includes a first, automatic shift gate, a second shift gate for a manual, step-by-step shifting operation (step-by-step shift gate), a selector lever, which is pivotably mounted within a gear shifting gate around a selector axis located under same. The selector axis is mounted in a housing, which accommodates the shifting device and is a rigid part of the vehicle body. The shift axis is orthogonal to the selector axis and is located in the same plane as it is. A mounting point is located above the shift axis in the housing. A selector lever support is mounted with the selector lever pivotably around the selector axis. The selector lever support accommodates the selector lever pivotably around the shift axis and can be caused by a locking pin to mesh with a complementary recess of the housing.

A shifting device according to the present invention for an automatic transmission of a motor vehicle has a selector lever. On the top side of this selector lever, which faces the driver of the vehicle, a shift knob is located.

The selector lever is mounted pivotably around a selector axis in a housing that is a rigid part of the vehicle body, as a result of which the changeover between the automatic and step-by-step shift gates is possible. In addition, it is pivotable around the shifting axis together with a selector lever support. The selector lever support has, corresponding to the solution proposed, a locking pin, which can be meshed with a complementary recess of the housing.

The locking pin preferably engages the recess of the housing when the selector lever is located in the automatic shift gate. The selector lever is pivoted around the shift axis in the known manner, so that the individual gears can be selected by the driver of the vehicle. Depending on the type of shifting, a tie rod may be axially movably guided within the selector lever, which usually has a hollow design. If such a tie rod shall be used, it is advantageous to allow it to slide in a spring-mounted manner within a contour, which is milled in the selector lever support or in the housing and corresponds to the individual automatic gears.

As is known, the driver of the vehicle is able to shift the transmission manually according to his wishes in the step-by-step shift gate by tappingly moving the shift lever in one direction or the other. The shifting signals can be picked up and transmitted in a great variety of ways. However, this is not the subject of the present invention.

To perform a changeover from the automatic shift gate into the step-by-step shift gate, the selector lever is pivoted sideways around the selector axis mounted in the housing that is a rigid part of the housing. The connection between the locking pin of the selector lever support and the recess of the housing is now disengaged. The selector lever is also pivoted around the shifting axis within the step-by-step shift gate. It is now supported in the housing via a ball pivot. This ball pivot is used both for connecting with the transmission element, which in turn represents the connection between the shifting device and the transmission of the vehicle, and to mount and support the selector lever in the housing. To mount and support the selector lever in the housing, the ball pivot passes with its pivot end through the selector lever and engages the complementary mounting point of the housing. This mounting point should advantageously be lined with a plastic having limited elasticity.

A first locking means is provided according to the present invention, and it acts on the selector lever in an elastic manner when the selector lever is moved, so that after overcoming a "top dead center," the selector lever is fixed by the locking means in its position in one of the two shift gates. The selector lever is thus held elastically in this position. The gear-shifting processes can be manually preset by the driver of the vehicle in the step-by-step shift gate. The selector lever is pivoted for this purpose by an angle of a few degrees. The step-by-step shifting is consequently performed by briefly pressing the selector lever in the corresponding direction. To simulate the shifting process in the step-by-step shift gate, a second locking means is provided in the housing. This locking means generates a spring force directed opposite the direction of movement of the selector lever. It generates more or less only a working point and additionally presses the selector lever back into its starting position within the step-by-step shift gate, but it shall not represent a true locking, as in the case of the first locking means. The two locking means may have an identical design.

Such a shifting device has a very simple design and therefore it can be manufactured at a low cost. A substantial reduction in weight and a possibility of more rapid assembly are achieved due to the few, simple components compared with prior-art designs.

One preferred exemplary embodiment of the present invention will be explained in greater detail below with reference to the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
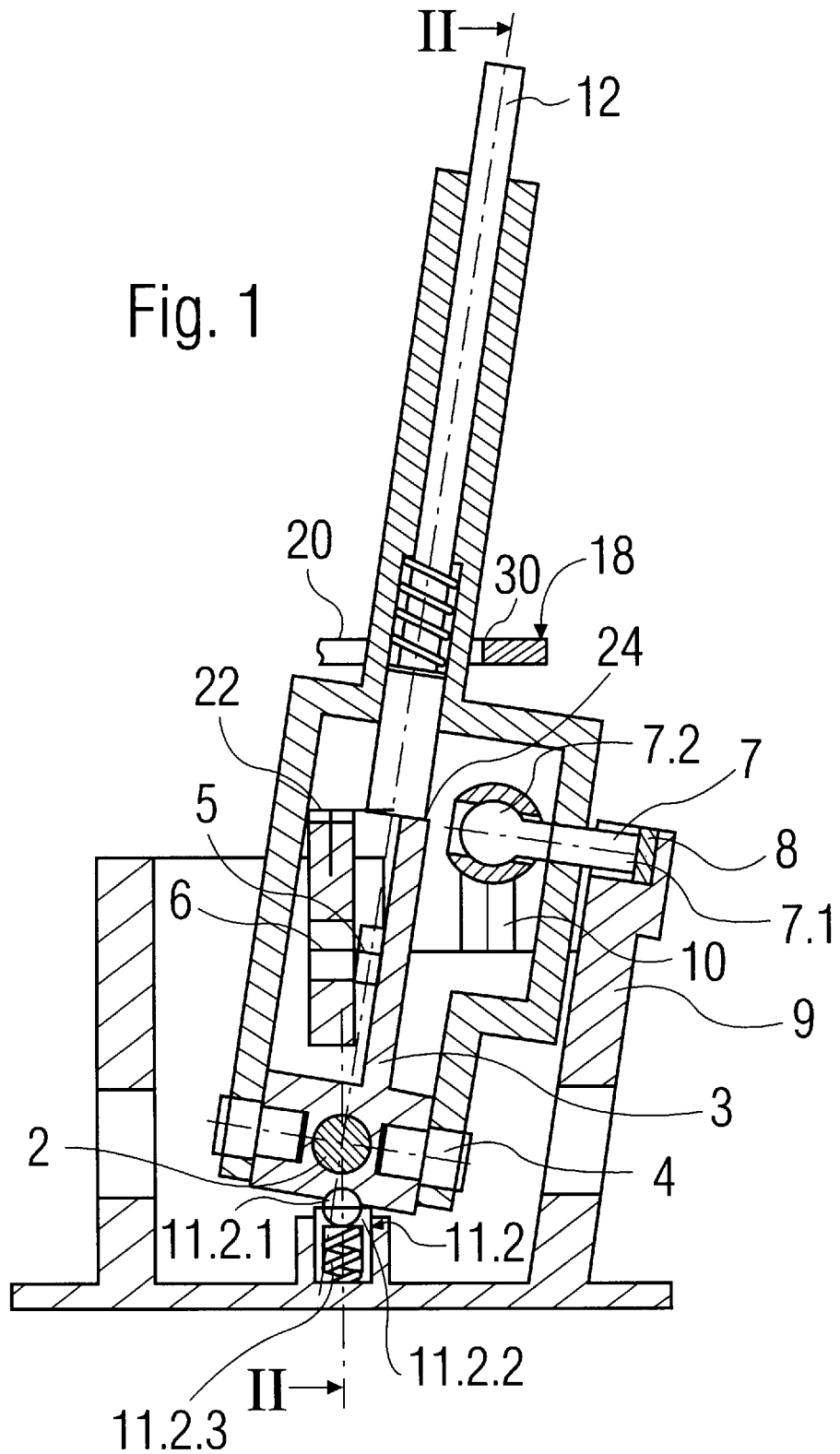
FIG. 1 is a sectional view of a shifting device according to the present invention with upper connection of the cable.

Referring to the drawings in particular, FIG. 1 shows a shifting device according to the present invention for an automatic transmission of a motor vehicle. It has a selector lever 1, on the upper side of which, facing the driver of the vehicle, there is a shift knob. The gear shifting gate 20 is part of shift gate member 18, within which the selector lever 1 is guided. The this shift knob is not shown in FIG. 1 for simplification.

The selector lever 1 is pivotable around a selector axis 2 in a housing 9 that is a rigid part of the vehicle body 40. In addition, it is pivotable around the shifting axis 4 together with a selector lever support 3. Corresponding to the solution proposed, the selector lever support 3 has a locking pin 5, which can be meshed with a complementary recess 6 of the housing 9.

The locking pin 5 engages the recess 6 of the housing when the selector lever 1 is located in the automatic shift gate. The selector lever 1 is pivoted around the shift axis 4 in the known manner, so that the individual gears can be selected by the driver of the vehicle. A tie rod 12 is guided axially movably within the selector lever 1, which has a hollow design. This tie rod 12 is slidably guided in a spring-mounted manner within a contour 22, which is milled into the housing 9 and corresponds to the individual automatic gears.

The selector lever support 3 is provided with a radial surface 24. The tie rod 12 slides over some areas of this radial surface 24.

To perform a changeover from the automatic shift gate into the step-by-step shift gate 30, the selector lever 1 is pivoted sideways around the selector axis 2 to a position as shown in FIG. 1. The selector axis 2 is provided based on a member mounted in the housing 9 that is a rigid part of the vehicle body. The connection between the locking pin 5 of the selector lever support 3 and the housing recess 6 is now disengaged (as shown in FIG. 1). The selector lever 1 is likewise pivoted around the selector axis 4 within the step-by-step shift gate 30. The shifting lever 1 is supported in the housing via a ball pivot 7. This ball pivot 7 is used for both connection to a transmission element 10, which in turn represents the connection between the shifting device and the transmission of the vehicle and is a cable in the embodiment shown, and to mount and support the selector lever 1 in the housing 9. The ball pivot 7 is connected to the transmission element 10 via a bearing shell, which is fastened to the transmission element 10 and preferably consists of a plastic and accommodates the ball 7.2 of the ball pivot 7. To mount and support the selector lever 1 in the housing 9, the ball pivot 7 passes with its pivot end 7.1 through the selector lever 1 and engages a complementary mounting point 8 of the housing 9. This mounting point 8 is lined with a plastic 8.1 having limited elasticity.

Figure 2:
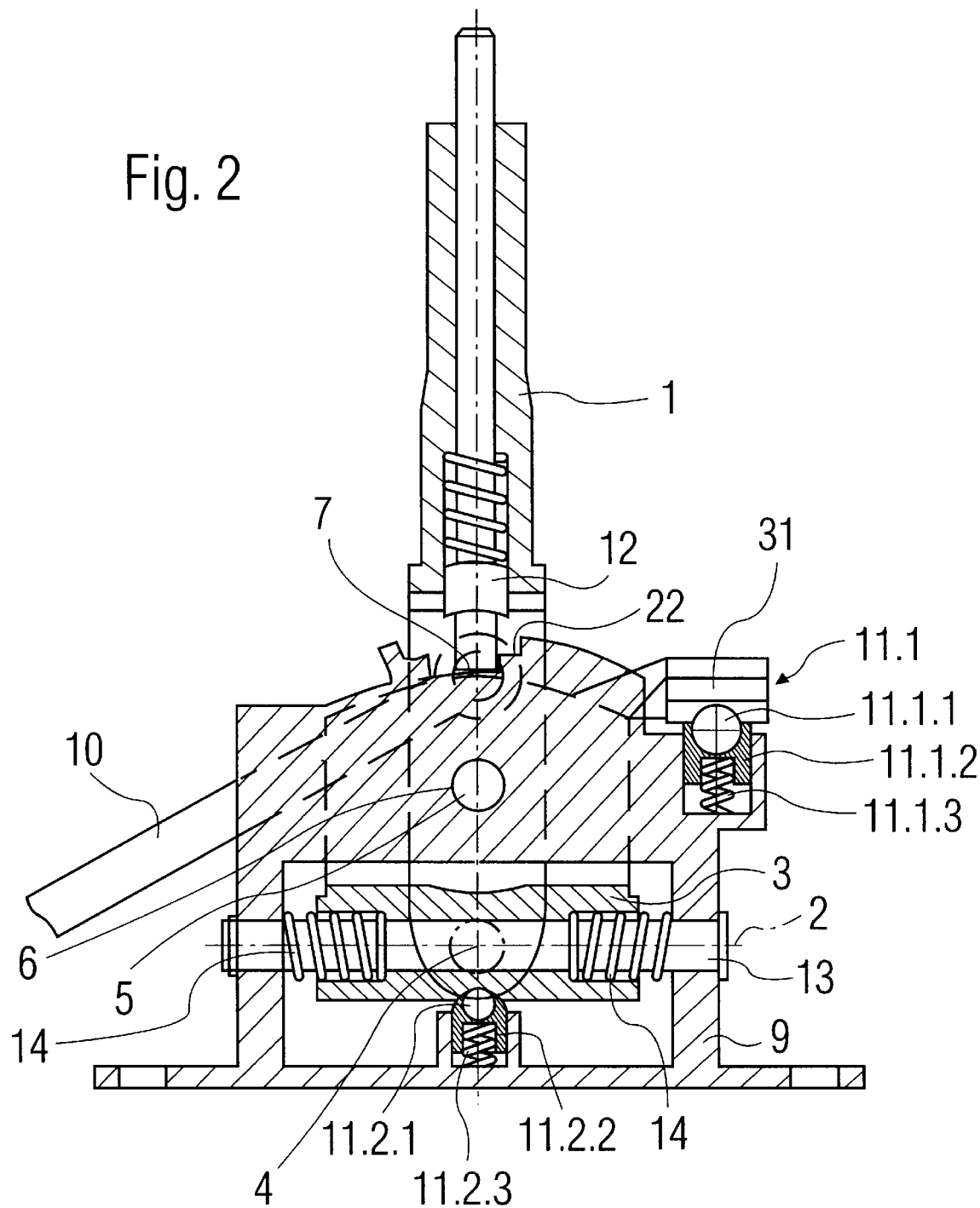
FIG. 2 is a sectional view of a shifting device according to the present invention with upper connection of the cable in the view taken along line II—II of FIG. 1.

As is apparent from FIG. 2, a first locking means 11.1 is provided according to the present invention. The locking means 11.1 includes a ball 11.1.1 which can engage a recess formed in an engagement portion 31 of the selector lever 1. The ball 11.1.1 also is seated in a plastic (elastic) seat 11.1.2 and is urged toward the selector lever seat via spring 11.1.3. The locking means 11.1 acts elastically on engagement portion 31 of the selector lever 1 when the selector lever 1 is pivoted (with engagement portion 31 fixed for movement with lever 1), so that the selector lever 1 is fixed by the locking means 11.1 in its position in one of the two shift gates after overcoming a "top dead center." The selector lever is thus held elastically in this position. The gearshifting processes can be manually set by the driver of the vehicle in the step-by-step shift gate 30.

Figure 5:
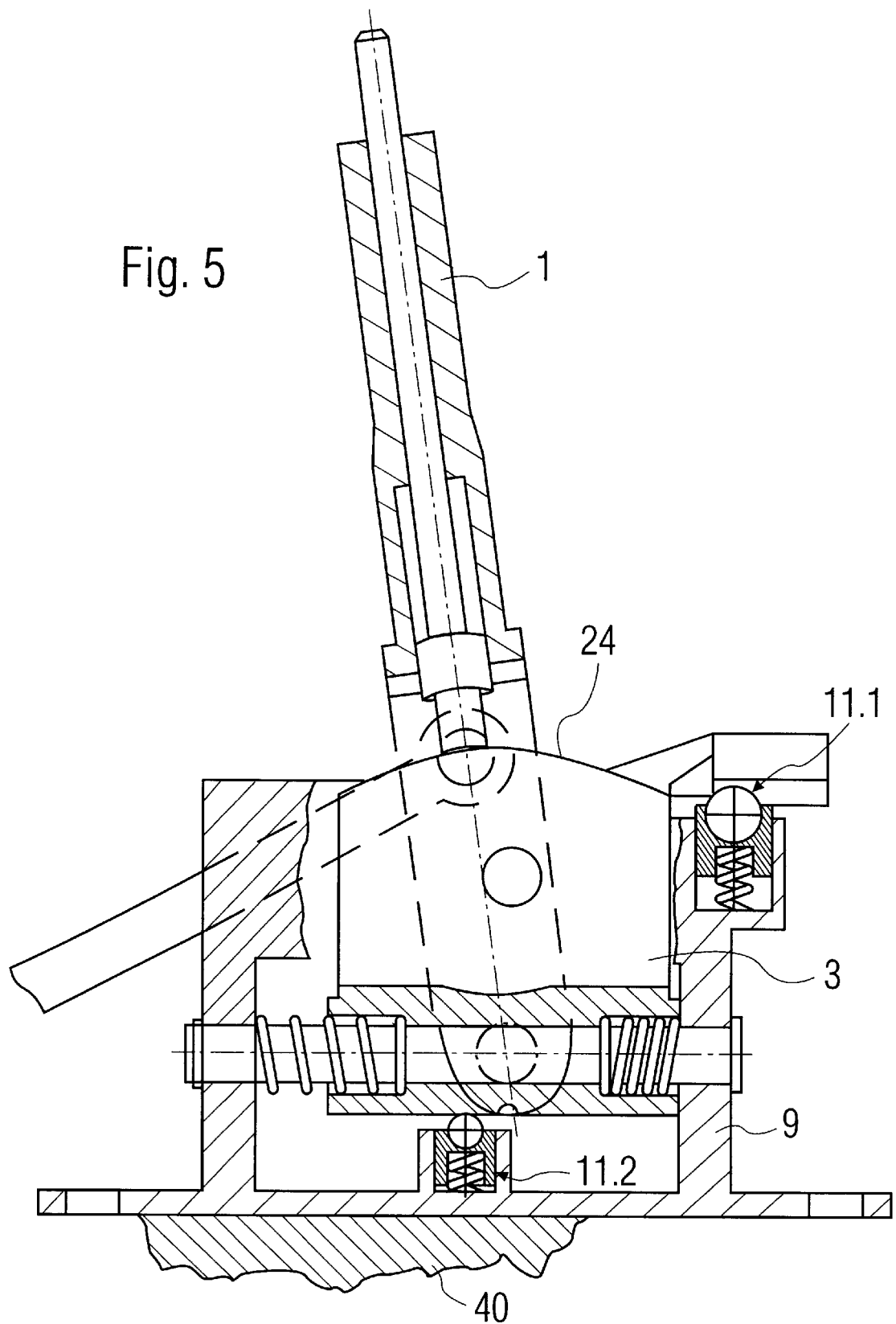
FIG. 5 is a sectional view of the shifting device according to the present invention with upper connection of the cable and with a portion of the housing cut-away.
Figure 6:
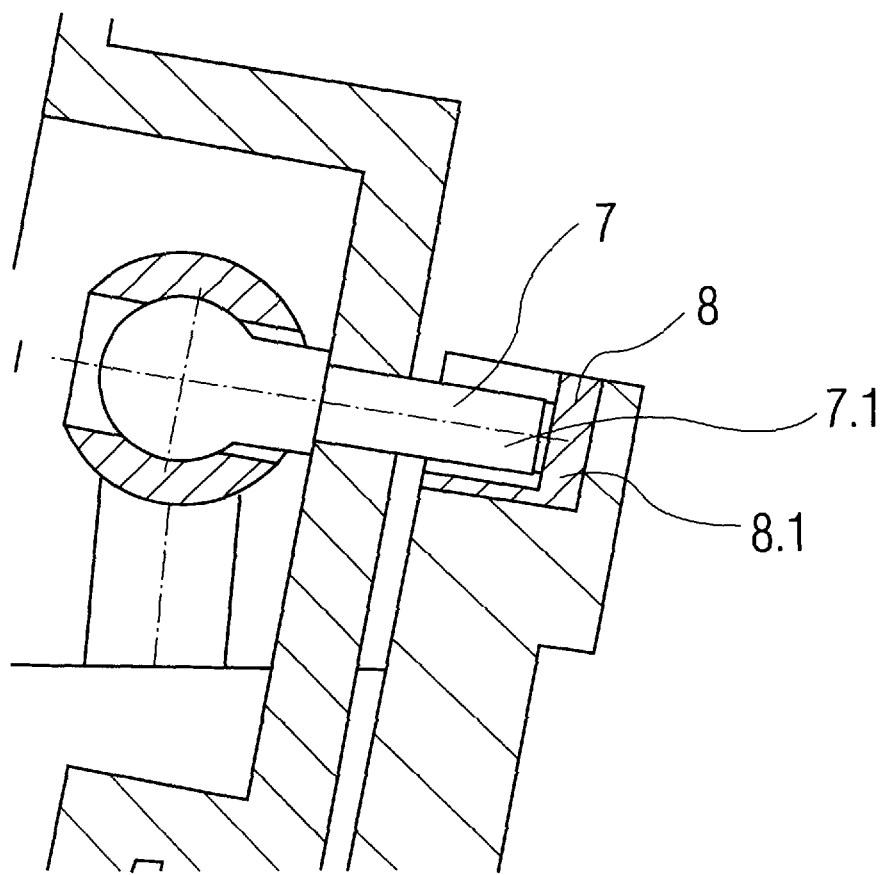
FIG. 6 is an enlarged sectional view of a mounting point lined with plastic.

The selector lever 1 is pivoted for this purpose according to the present invention by an angle of a few degrees. The step-by-step shifting is consequently performed by briefly pressing the selector lever 1 in the corresponding direction. To simulate the shifting process in the step-by-step shift gate, a second locking means 11.2 is provided in the housing 9. The second locking means 11.2 includes a ball 11.2.1 which can engage a recess formed in a lower portion of the selector lever (see FIG. 5). The second locking means also includes a seat 11.2.2 and a spring 11.2.3. This locking means 11.2 generates a spring force opposite the direction of movement of the selector lever 1. It generates more or less only a working point and it additionally presses the selector lever 1 back into its starting position within the step-by-step shift gate 30, but it shall not represent a true locking, as in the case of the first locking means 11.1. The two locking means 11.1 and 11.2 have identical design.

According to the embodiment of a shifting device according to the present invention, which is shown in FIG. 2, the selector axis 2 is formed by a simple bolt 13 mounted in the housing 9. This bolt 13 is supported on both sides by coil springs 14 between the selector lever support 3 and the housing 9 and thus it also positions the selector lever 1. The tie rod 12 slides in the contour of the housing 9 as well as over some areas of the selector lever support 3. In this way, the selector lever support 3 is supported on bolt 13 and biased by a springs 14 with respect to housing 9. The springs provides support as the selector lever 1 is moved slightly in the axial direction of the selector axis 2 when the manual tapping shifting (step shifting) is performed in the step-by-step shift gate 30.

Figure 3:
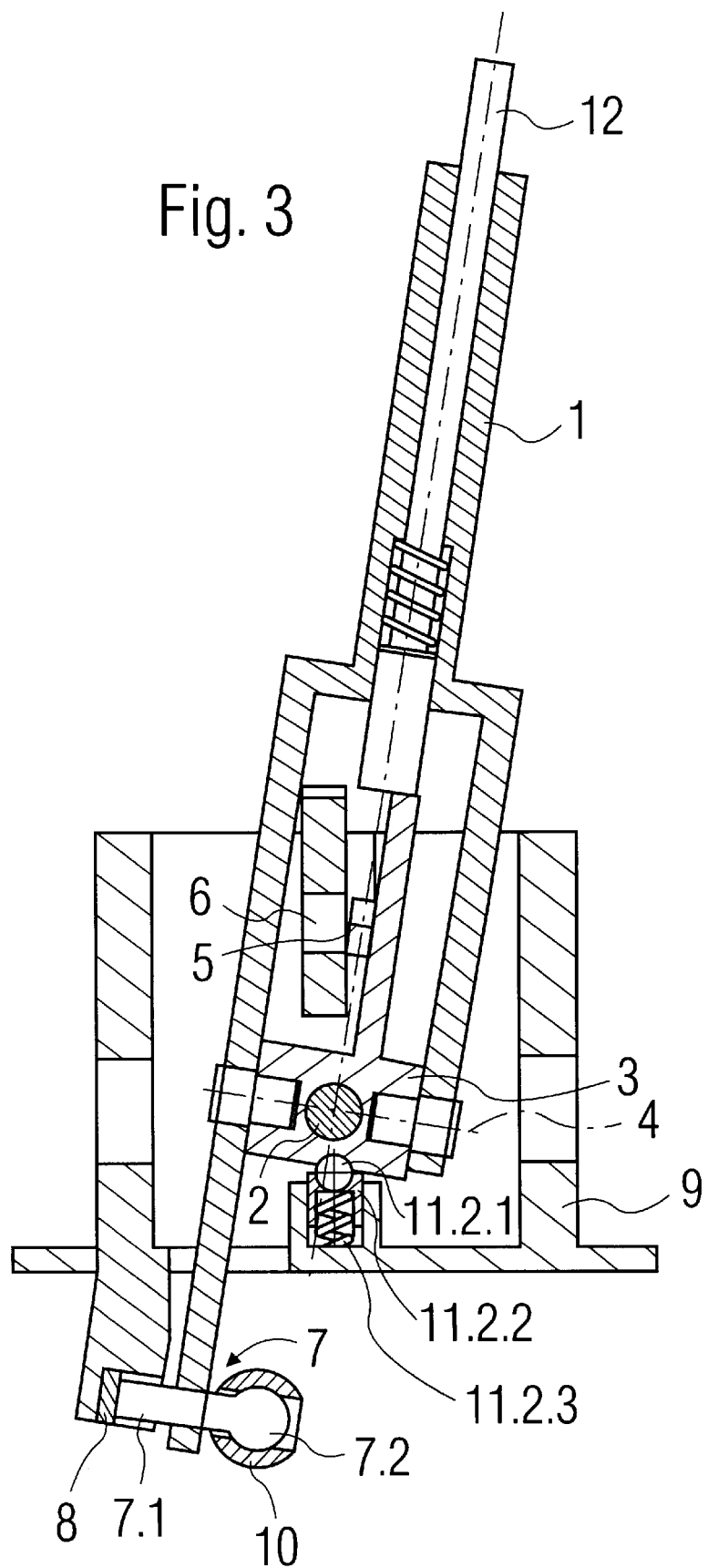
FIG. 3 is a sectional view of a shifting device according to the present invention with lower connection of the cable.
Figure 4:
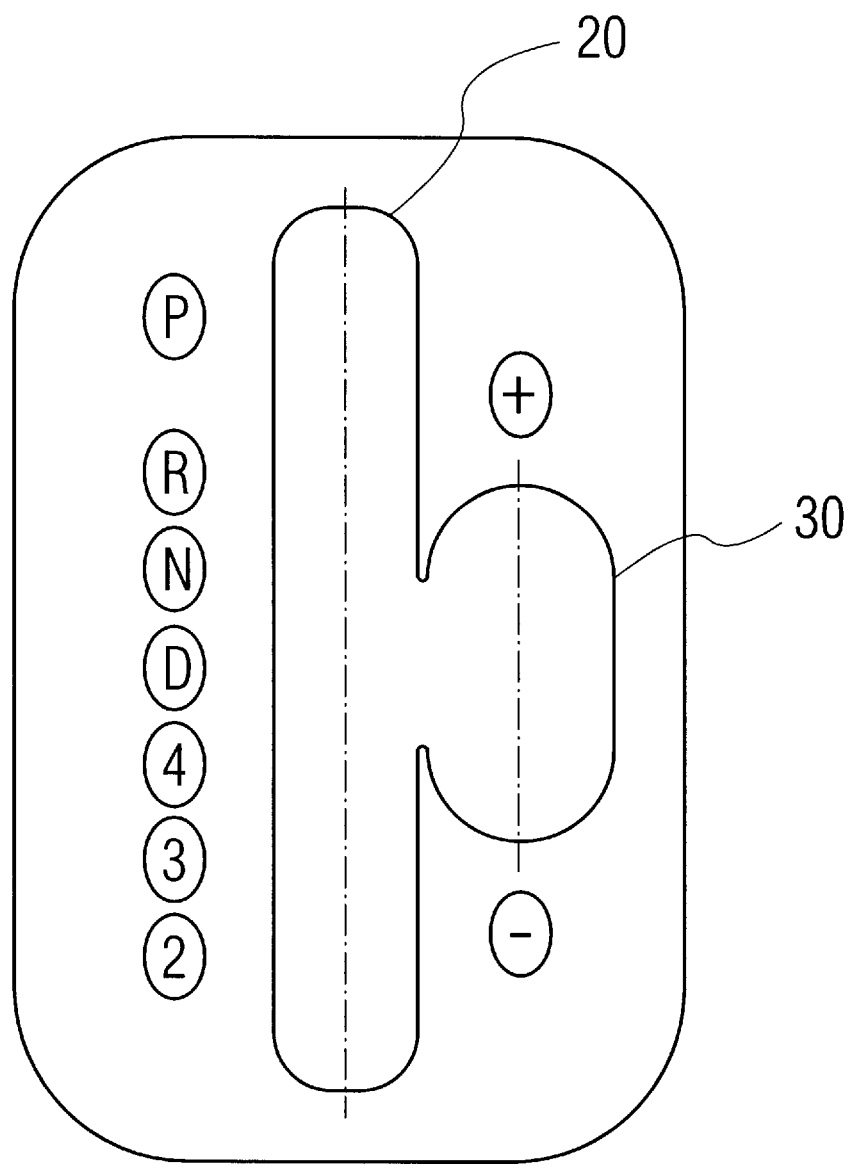
FIG. 4 is a top view of shifting gates

FIG. 3 shows a shifting device according to the present invention, in which the transmission element is connected in the lower area of the selector lever 1. This design is somewhat more slender than the embodiments described in FIGS. 1 and 2, but it requires more room in height.

While specific embodiments of the invention have been shown and described in detail to illustrate the application of the principles of the invention, it will be understood that the invention may be embodied otherwise without departing from such principles.

APPENDIX

List of Reference Numbers:
1 Selector lever
2 Selector axis
3 Selector lever support
4 Shift axis
5 Locking pin
6 Housing recess
7 Ball pivot
7.1 Pivot end
7.2 Ball
8 Mounting point
9 Housing
10 Transmission element
11.1 Locking means
11.2 Locking means
12 Tie rod
13 Bolt
14 Coil spring

What is claimed is:

1. A shifting device for an automatic transmission of a motor vehicle with a first, automatic shift gate, and with a second shift gate for a manual, step-by-step shifting operation, the shifting device comprising:

a housing
a selector lever;
selector axis means defining a selector axis, said selector lever being pivotably mounted within said automatic shift gate for pivotal movement around said selector axis means, said selector axis means being located at or adjacent to a bottom of said selector lever, said selector axis means being mounted in said housing, said housing accommodating said shifting device and being rigidly connected to a vehicle body;

shift axis means defining a shift axis which is orthogonal to said selector axis and is located in a common plane with said selector axis, said shift axis means having a mounting point located above said shift axis in said housing;

a selector lever support mounted with said selector lever pivotably around said selector axis, said selector lever support accommodating said selector lever pivotably around said shift axis; and a locking pin connected to said selector lever support, said locking pin being meshable with a complementary recess of said housing.

2. The shifting device for an automatic transmission of a motor vehicle in accordance with claim 1, further comprising a ball pivot with a ball and a pivot end, said pivot end passing through said selector lever above said shift axis, said ball pivot engaging in the step-by-step shift gate a mounting point located in said housing; and a transmission element arranged at said ball of said ball pivot.

3. The shifting device for an automatic transmission of a motor vehicle in accordance with claim 2, wherein said mounting point of said housing is lined with a plastic having limited elasticity.

4. The shifting device for an automatic transmission of a motor vehicle in accordance with claim 1, further comprising: first locking means for fixing said selector lever in one of the respective shift gates and additionally a second locking means for generating a working point for the step-by-step shifting process in the step-by-step sift gate.

5. The shifting device for an automatic transmission of a motor vehicle in accordance with claim 2, further comprising: first locking means for fixing said selector lever in one of the respective shift gates and additionally a second locking means for generating a working point for the step-by-step shifting process in the step-by-step sift gate.

6. The shifting device for an automatic transmission of a motor vehicle in accordance with claim 3, further comprising: first locking means for fixing said selector lever in one of the respective shift gates and additionally a second locking means for generating a working point for the step-by-step shifting process in the step-by-step sift gate.

7. A shifting device for an automatic transmission of a motor vehicle with a first, automatic shift gate, and with a second shift gate for a manual, step-by-step shifting operation, the shifting device comprising:

a housing
a selector lever;
selector axis means defining a selector axis, said selector lever being pivotably mounted within said automatic shift gate around said selector axis means, said selector axis means being located below a hand engagement portion of said selector lever, said selector axis means being disposed in said housing, said housing accommodating said shifting device and being rigidly connected to a vehicle body;

shift axis means defining a shift axis which is orthogonal to said selector axis and is located in a common plane with said selector axis, said shift axis means having a mounting point located above said shift axis in said housing;

a selector lever support mounted with said selector lever pivotably around said selector axis, said selector lever support accommodating said selector lever pivotably around said shift axis; and a locking pin connected to said selector lever support, said locking pin being meshable with a complementary recess of said housing.

* * * * *